United States Patent [19]

Hochberg

[11] Patent Number: 5,420,235
[45] Date of Patent: May 30, 1995

[54] CONTINUOUS POLY (HYDROXY ACID) POLYMERIZATION USING A COUNTER-CURRENT IMPELLER MIXING SYSTEM

[75] Inventor: Jerome Hochberg, Wilmington, Del.

[73] Assignee: E. I. du Pont de Nemours and Company, Wilmington, Del.

[21] Appl. No.: 6,726

[22] Filed: Jan. 21, 1993

[51] Int. Cl.⁶ .............................................. C08G 63/08
[52] U.S. Cl. ........................................ 528/354; 526/64
[58] Field of Search .......................... 528/354; 526/64

[56] References Cited

U.S. PATENT DOCUMENTS

| | | | |
|---|---|---|---|
| 3,839,297 | 10/1974 | Wasserman et al. | 528/357 |
| 4,653,497 | 3/1987 | Bezwada et al. | 528/354 |
| 4,800,219 | 1/1989 | Murdoch et al. | 525/413 |
| 4,844,854 | 7/1989 | Kaplan et al. | 525/411 |
| 4,948,847 | 8/1990 | Morita et al. | 526/64 |
| 4,952,627 | 8/1990 | Morita et al. | 525/52 |
| 5,028,667 | 7/1991 | McLain et al. | 525/415 |

FOREIGN PATENT DOCUMENTS

3936188A1 5/1990 Germany.

OTHER PUBLICATIONS

Krichldorf, H. R. & Sumbel, M., European Polymer Journal, vol. 25, No. 6, pp. 585–591 (1989).

*Primary Examiner*—John Kight, III
*Assistant Examiner*—Terressa Mosley

[57] ABSTRACT

This invention relates to an improved process for continuously producing catalyzed melt polymerization polymers and apparatus for intimately mixing the components during the process. In particular, this invention relates to the continuous catalytic polymerization of poly(hydroxy acids) using a counter-current impeller mixing system.

9 Claims, 2 Drawing Sheets

CONTINUOUS POLY (HYDROXY ACID) POLYMERIZATION USING A COUNTER-CURRENT IMPELLER MIXING SYSTEM

BACKGROUND OF THE INVENTION

1. Field of the Invention

This invention relates to an improved process for continuously producing catalyzed melt polymerization polymers and apparatus for intimately mixing the components during the process. In particular, this invention relates to the continuous catalytic polymerization of poly(hydroxy acids) using a counter-current impeller mixing system.

2. Description of the Related Art

Poly(hydroxy acids), such as poly(lactic acid) and poly(glycolic acid), are generally known in the art. Conventionally, they have been produced by batchwise polymerization in a heated vessel. The reaction is catalyzed by a number of conventional catalysts: for example see U.S. Pat. Nos. 5,028,667 and 3,839,297.

Continuous catalytic production of polymerized dimers of glycolic and related acids has also been carried out using a heated extrusion screw reactor (see German DE 3936188 A1). While the extrusion screw technique has advantages inherent in a continuous operation, it is costly equipment that is expensive to operate and requires frequent maintenance.

Continuous catalytic polymerization tubular reactors having several sections are also known in the art for the preparation of other polymers, (see U.S. Pat. Nos. 4,948,847 and 4,952,627). Only the aforementioned German DE 3936188 A1 discloses continuous polymerization of a dimer of an alpha-hydroxycarboxylic acid, and as aforementioned, the process therein described is expensive, greatly limiting the economical uses of the polymers made thereby.

SUMMARY OF THE INVENTION

The invention relates to an improved process for producing catalyzed melt polymerizaton polymers and apparatus for intimately mixing the components during the process. Liquid material to be polymerized and catalyst liquid are introduced into a mixing chamber where they are mixed by at least one high speed rotary impeller and then withdrawn from the chamber near the axis of the chamber. The process is particularly useful for mixing with catalyst molten cyclic ester dimers of one or more alpha-hydroxycarboxylic acids, such as lactide and/or glycolide.

DESCRIPTION OF THE PREFERRED EMBODIMENTS

Figure 1:
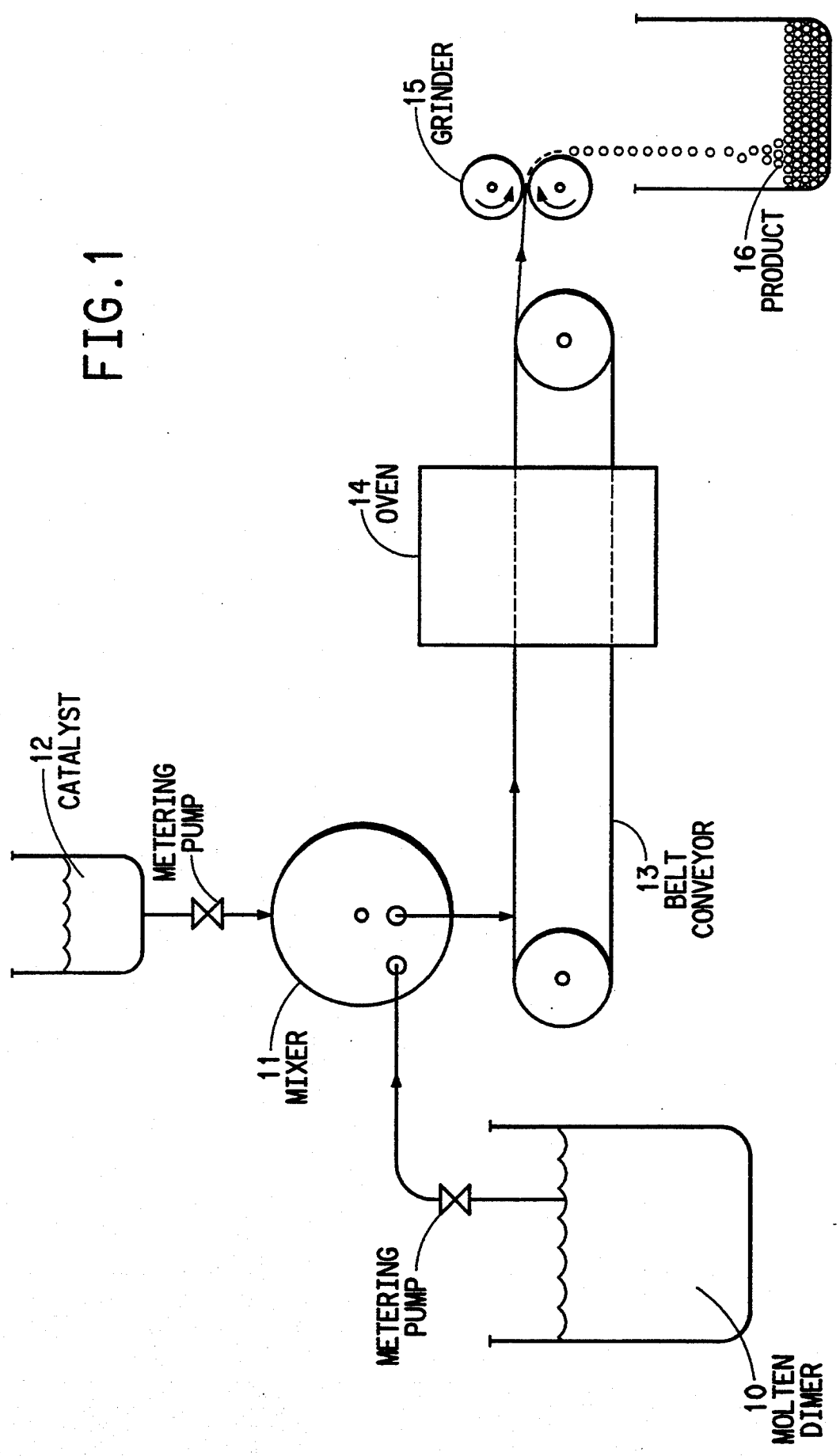
FIG. 1 is a schematic illustration of the preparation of polymer utilizing the mixing step and apparatus of this invention.

The present invention relates to an improved process for producing inexpensively and at very rapid rates catalyzed melt polymerization polymers, and particularly poly(hydroxy acid) (PHA) polymers of high purity and controlled properties such as percent residual dimer, color and uniformity.

The improved process, as related to PHA preparation whereby there is polymerization of a molten dimer of a cyclic ester of an alpha-hydroxycarboxylic acid mixed with a conventional catalyst in liquid form to produce PHA, comprises the mixing steps of:

a. introducing at least one molten dimer and, optionally, at least one additive or compatible copolymerizable monomer, into a closed mixing chamber defined by a mixing chamber wall, said mixing chamber containing a mixing zone having at least one impeller mounted therein, each of the at least one impeller having a hub and mixing blades extending radially from the hub with clearance space between the blade ends and the mixing chamber wall, the at least one dimer and, optionally, the at least one additive or compatible copolymerizable monomer, being introduced into said mixing chamber at a dimer introduction port near the axis line of the at least one impeller under sufficient pressure to overcome the centrifugal pressure which is generated by the at least one impeller during rotation;

b. introducing at least one catalyst into the mixing chamber at a catalyst introduction port under sufficient pressure to overcome the centrifugal pressure which is generated by the at least one impeller during rotation;

c. rapidly rotating the at least one impeller to intimately mix the at least one dimer, the at least one additive or compatible copolymerizable monomer, if present, and the at least one catalyst to form a dimer/catalyst mixture;

d. retaining the at least one dimer in the mixing zone long enough for it to be intimately mixed with the at least one catalyst but not long enough for significant polymerization of the at least one dimer to occur; and, e. withdrawing the resultant dimer/catalyst mixture from the mixing zone at an exit port located near the axial center line of the mixing zone, the exit port being located at a point which is remote from said dimer introduction port and said catalyst introduction port.

The mixture residence time in the mixing zone is regulated so that little or no polymerization takes place during the mixing. The extent of polymerization can be measured by the increase in viscosity which occurs as the molten dimer is polymerized. The preferred viscosity of the exiting mixture of dimer and catalyst is from about 500 to about 3000 centipoise. After removal from the mixing zone, the mixture may be maintained at polymerization temperature to complete polymerization to the desired extent. Supplemental heating may not be needed in view of the normally exothermic nature of such polymerizations.

A preferred technique is to run the polymerizing mixture out of the mixing chamber onto a liquid conveyor (optionally either into separate pans on a conveyor or directly onto an indented conveyor belt), maintaining the liquid on the conveyor at polymerization temperature until the desired level of polymerization is completed, and then cooling the polymer if necessary. The solid polymer can then be fed through a pulverizing mechanism to produce pieces of bulk polymer for further use such as thermoshaping.

Preferably, a conventional end-capping agent such as isopropanol, is included in the polymerization mixture to control the molecular weight. This advantageously is done by including it in and adding it with the catalyst (e.g., it may be the carrier liquid or solvent for a powder or soluble polymerization catalyst).

The invention also relates to a unique apparatus for achieving the step of intimately mixing the catalyst in liquid form with the liquid material to be polymerized, which apparatus comprises:

a. a closed mixing chamber defined by a mixing chamber wall, wherein the mixing chamber contains a mixing zone;

b. positioned within the mixing zone, at least one impeller having a hub and mixing blades extending radially from said hub, said hub being mounted on an impeller shaft so that said mixing blades also extend radially from the shaft; each of the at least one impeller having a mixing blade diameter small enough to leave a space between the impeller blade ends and the mixing chamber wall;

c. means for rapidly rotating the at least one impeller;

d. feed means for metering material to be polymerized into the mixing zone near the axis of the at least one impeller at sufficient pressure to overcome the centrifugal force or pressure generated by the at least one impeller during rotation;

e. means remote from the feed means at or near the axis of the at least one impeller to remove mixed product; and, f. metering means to introduce polymerization catalyst into the mixing zone at a point remote from the point of removal of the mixed product and at sufficient pressure to overcome the centrifugal force or pressure generated by the at least one impeller during rotation.

As aforementioned, the preferred dimers used in the present process comprise cyclic esters of alpha hydroxycarboxylic acid, preferably lactide and/or glycolide. For these dimers, the polymerization reaction is carried out by known methods at a temperature which can range from about 130° C. up to about 220° C. and at a pressure from ambient to about 2000 psi (13.8 MPA). Lactide or glycolide can be polymerized alone, together or with certain other copolymer forming monomers. For example, lactide/glycolide copolymers can be made, and up to about 30 mole percent of other copolymerizable monomer moieties, such as for examples epsilon-caprolactone, delta-valerolactone, 1,5-dioxepan-2-one, 1,4-dioxan-2-one, beta-butyrolactone, beta-propiolactone, and 6-methyl 2,5-morpholinedione, or mixtures thereof can also be used in the polymerization reaction. Most preferred is a mixture containing at least about 80% lactide, the balance comprising other copolymerizable material. If desired other additives may be included in the molten dimer such as fillers, pigments and plasticizers.

In polymerizing pure lactide or a mixture comprising a major percentage of lactide, it is preferred that the weight average molecular weight of the polymerized product be in the range of about 20,000 to 500,000. A molecular weight control agent may be used, such as any alcohol [for further details see: European Polymer Journal, Vol. 25, No. 6, p. 585–591 (1989), Kricheldorf, H. R. & Sumbel, M., incorporated by reference herein for such purposes], to help produce the desired molecular weight product. This may be added at any convenient location into the mixing zone.

The catalyst can be any single catalyst or combination of catalysts that catalyze the polymerization of the selected dimer(s). Preferred catalysts, especially for use with lactide and glycolide dimers, are stannous compounds such as stannous octoate, and the yttrium and rare earth compounds disclosed in U.S. Pat. No. 5,028,667, which patent is incorporated by reference herein and made a part hereof.

The catalyst is added in liquid form, either as a liquid compound or as a solution or suspension in a liquid. The liquid containing the catalyst is either inert to the polymerizing materials or acts as an end-capping agent to control the molecular weight of the polymer. Organic solvents, such as toluene, are effective for many stannous catalysts, although no solvent is needed for catalyst compounds that are liquid, other than to assist in controlling the catalyst concentration.

Aqueous liquids should be avoided because water interferes with the polymerization. The total water content of the materials introduced into the mixing chamber is very important (i.e., the materials should be substantially free of water).

The ratio of lactide to catalyst is very important for rapid polymerization. Where the dimer to be polymerized contains over about 80% lactide, optimum polymerization is achievable using a molar dimer to catalyst ratio in the range of about 10,000:1 to 500:1.

The process and apparatus of the present invention are best described by reference to the drawings.

In FIG. 1, which is a schematic of the entire polymer preparation process including the present apparatus, 10 represents a container of molten material to be polymerized, preferably lactide, glycolide or mixtures thereof; the molten material to be polymerized is pumped from container 10 to mixing chamber 11, entering chamber 11 near the axis line of the impeller therein (not shown). The molten material is under adequate pressure to overcome the centrifugal pressure of the impeller, rapidly rotating inside the mixing chamber. Reservoir 12 contains catalyst liquid, which is metered into the mixing chamber at a location remote from the mixture exit. Preferably, the catalyst liquid is introduced into the mixing chamber at a point near the impeller blade ends, substantially tangentially to the circle defined by the ends of the impeller blades (e.g., the circle defined by the ends of the impeller blades during rotation of the impeller). Violent mixing of these two materials takes place in the mixing chamber, as the impeller blades force the materials toward the walls of the chamber. The pressure of the materials fed through the mixing zone is sufficient to remove the mixture at a location remote from the chamber walls near or at an axial center of the impeller, countercurrent to the normal centrifuge flow which is fluid enters at the axis and exits at the circumference. Exit from the chamber through the end cover opposite from the molten material feed entrance is a preferred technique.

As the catalyst and molten material become intimately mixed, the temperature of the mixture usually elevates because of the start of exothermic polymerization. The residence time of the catalyst and molten material are controlled to be long enough to achieve intimate mixing but not long enough for significant polymerization that would foul the components of the mixer and/or interfere with removal of the polymerizing mixture from the mixing chamber.

In the embodiment shown in FIG. 1, the polymerizing mixture exits through the chamber end cover that is at the end of the chamber away from the molten material entrance. This mixture can be fed to a shaped belt conveyor 13, or optionally either onto individual trays, or directly onto an indented liquid retaining conveyor belt. Polymerization is completed to any desired degree on the conveyor belts which can be fed through an inert atmosphere and a heat source such as oven 14 if additional heat is needed. The hardened polymer (cooled if necessary) can be fed to a grinder 15 that fractures the polymer into any size desired for sale or further processing and deposits it into containers 16, such as bags.

Figure 2:
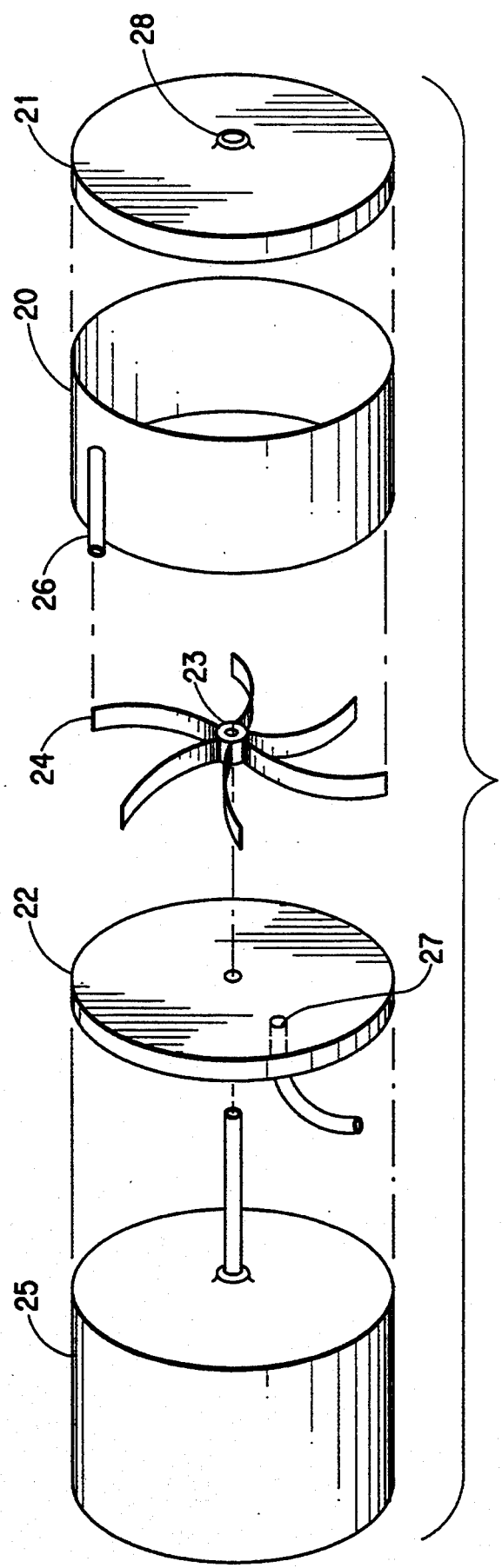
FIG. 2 is an expanded view of the preferred mixing apparatus of the present invention.

Referring to FIG. 2, which shows the details of the apparatus which is used in the process of the present inventions 20 is the mixing chamber wall. Preferably, the mixing chamber is cylindrical (or nearly cylindrical) in shape with end covers 21 and 22, but it can be of any closed shape, including triangular or square in cross section, so long as it does not channel the mixing liquids out of the mixing action area without adequate mixing.

Impeller 23 is rotatably mounted within the mixing chamber and is free to rotate with the impeller blades 24 spaced from the chamber wall 20 to leave a space or channel for liquid flow.

As shown, there is a single impeller 23 with a multiplicity of impeller blades 24, which extend radially from the hub of the impeller and, optionally, are curved somewhat so as to maximize the centrifugal force that impels the molten material toward the chamber wall 20. More than one impeller can be used to create more severe mixing, and they need not rotate in the same direction.

Also, it may be desirable to have a backing disc fixed on the side of the impeller that is adjacent to the dimer entrance port 27 closing this side of the impeller. The disc substantially covers the entire side of the impeller and may extend beyond the ends of the impeller blades to leave a small distance between the disc and the chamber wall 20. In this embodiment, the dimer entering through port 27 in end cover 22 near the axis of the impeller must travel radially toward the chamber wall 20 before it is contacted by the impeller blades. While being violently mixed with the catalyst liquid, the mixture is moved inwardly against centrifugal pressure toward the axis of the impeller to the exit port 28.

When the mixing apparatus is assembled, the at least one impeller is located within the mixing chamber and is mounted on the shaft of motor 25 which drives the at least one impeller.

The molten material to be polymerized is pumped (by a pump such as a diaphragm metering pump) into the mixing chamber through port 27 in end cover 22, near the axis line of the impeller. Catalyst liquid is metered into the mixing zone at a location remote from the exit port 28 of the mixture and near the ends of the impeller blades, such as through port 26 or through a port in end cover 22. The liquids are thoroughly mixed by being impelled violently toward the chamber wall 20, while moving toward the exit port 28 located near the impeller axis line through the opposite end cover 21.

This liquid flow pattern is distinctly different from the flow pattern of a centrifugal pump. There the liquid exit port is circumferentially, that is tangentially, located with respect to the impeller and the liquid basically is sucked axially into the pump to replace the liquid forced outward by the centrifugal pressure of the impeller to exit tangentially. In the present apparatus both the catalyst and polymerizable liquid must be pumped into the chamber at sufficient pressure to overcome the impeller centrifugal pressure and exit substantially axially from the mixing chamber.

Nevertheless an ideal, readily available piece of equipment to use as a mixing chamber is a centrifugal pump altered as follows; the mixture exits via the normal entry port; and the normal exit port is the entrance port for the catalyst; whereby catalyst liquid is metered into the chamber at sufficient pressure to overcome the at least one impeller's centrifugal force or pressure and at a point remote from the mixture exit port.

As used throughout the specification, the following terms have the meanings listed below:

"Mixing Chamber" is a closed chamber of any shape that will enable the at least one impeller to rotate therein, preferably with the cylindrical zone of rotation of the at least one impeller occupying most of the chamber (e.g., wherein the cylindrical zone of rotation encompasses at least about 70% of the mixing chamber volume). The overall flow path of the liquid to be polymerized enters and leaves approximately axially to the at least one impeller to cause rapid intimate mixing of catalyst and the liquid to be polymerized. Optimally, the mixing chamber is substantially cylindrical, with end covers having appropriate liquid entrance and mixture exits in opposite covers. However, the mixing chamber can be any shape, i.e. cylindrical, square, box, football and the like so long as the desired mixing can be done therein as described.

"Catalyst liquid" means polymerization catalyst in liquid form, i.e. a liquid catalyst material, a solution of a catalyst in a liquid or a solid powdered catalyst suspended in a liquid.

"Axis", as used in reference to the at least one impeller, means the impeller center line or axis extended through the ends of the mixing chamber. Typically, the chamber is approximately cylindrical, and the axial center line of the impeller is parallel to the length dimension of the chamber wall. The impeller axis may be the same as the axis of the chamber, or it may be off center with the two axes parallel.

The "cylindrical zone of rotation" of an impeller is the cylinder outlined by the rotation of the impeller, having a radius equalling the longest impeller blade radius and circular ends defined by the rotating edge line of the impeller. If more than one impeller is used, the "cylindrical zone of rotation" would be the sum of the individual cylindrical zones of rotation of each impeller.

The location of a port "at a point remote from another port" means that the two ports are located so that there is virtually no flow directly from one port to the other without the material being subjected to the violent impeller action and countercurrent flow.

EXAMPLE 1

This example demonstrates the present invention process and apparatus as used in the mixing of dimer and catalyst in the preparation of polylactic acid (PLA).

Lactide (lactic acid cyclic dimer) of 90/10 L/D isomer ratio was melted and was metered into a mixing chamber where it was intimately mixed with a catalyst liquid. The catalyst liquid was an about 10:1 volume/volume mixture of a toluene solution and isopropanol chain terminator, respectively. The toluene solution comprised about 0.5 molar stannous octoate catalyst in toluene and the chain terminator consisted of about 100% isopropanol.

The mixing chamber was a modified centrifugal pump Model S-25 made by Price Pump Company of Sonoma, Calif. The modifications shown in FIG. 2, were: attaching the catalyst feed to the usual pump exit port to pressure-feed the catalyst; adding an about ½ inch long cylindrical spacer (not shown in FIG. 2) between end cover 21 and impeller 23 of the pump to increase mixing residence time; hooking up the pumps normal entrance port to a pipe through which the final mixture exits; and using a port into the chamber through the end cover opposite from the end where the mixture exits, through which port the molten lactide was pumped into the mixing chamber. In these examples, the impeller, driven by a ⅓ H.P. motor, rotated at about 3600 rpm.

The feed lines for lactide and catalyst were kept heated with about 100 psi steam, and the pump was maintained at about 170° C. by electric heat. The molten lactide to be added to the centrifuge was maintained in a melter at about 165° C. prior to feeding to the pump.

Molten lactide was fed into the mixing chamber by a diaphragm metering pump at the rate of about 257 grams per minute in run 1, and about 400 grams per minute in run 2. In each run, catalyst liquid mixture was fed into the mixing chamber at the rate of about 2 grams per minute. In each run, about 8 pounds of mixture were prepared. In each case the mixture had polymerized slightly in the mixing chamber, as indicated by the viscosity of the exiting mixture being about 1000 cp., as compared to a viscosity of about 10 cp. for the initial heated lactide.

The partly polymerized lactide from the mixing chamber was fed to flat casting pans, which were filled to about 1" depth. The pans containing the polymerizing lactide were covered and heated for about 2 hours at about 150° C. in an air convection oven. Conversion to polylactide was about 97.8% and 94.7% for runs 1 and 2 respectively. The polymer from each run had a weight average molecular weight of about 200,000.

EXAMPLES 2-9

Using the apparatus and procedure of run 2 of Example 1, except for adjustments in feed rates, concentrations and temperatures, which could be easily determined by one skilled in the art, and using the feed materials as indicated in the table, excellent polymers are produced.

TABLE

| Example | Material to be Polymerized | Catalyst Liquid |
|---|---|---|
| 2 | glycolide 100% | stannous octoate |
| 3 | lactide/glycolide 50/50 | stannous octoate |
| 4 | lactide/caprolactone 80/20 | zinc oxide |
| 5 | lactide/glycolide/butyrolactone 60/30/10 | butyl lithium |
| 6 | glycolide/caprolactone 90/10 | antimony oxide |
| 7 | lactide/valerolactone 90/10 | yttrium tris (isopropoxide) |
| 8 | lactide/1,4-dioxan-2-one 90/10 | yttrium tris (2-phenylethoxide) |
| 9 | lactide/propiolactone 80/20 | dibutyl tin dilaurate |

What is claimed:

1. A continuous process for producing polymers of poly(hydroxy acids), wherein at least one molten cyclic ester dimer of an alpha-hydroxy carboxylic acid in a liquid state, at least one polymerization catalyst in liquid form and, optionally, at least one additive or compatible copolymerizable monomer, are intimately mixed to form a dimer/catalyst mixture which is then thermally polymerized, the steps comprising:

a. introducing said at least one molten dimer and, optionally, said at least one additive or compatible copolymerizable monomer, into a closed mixing chamber containing a mixing zone having at least one impeller mounted therein, each of said at least one impeller having a hub and mixing blades extending readily from said hub with clearance space between the blade ends and the mixing chamber wall, said at least one molten dimer and, optionally, said at least one additive or compatible copolymerizable monomer, being introduced into said mixing chamber at a dimer introduction port near the axis line of the at least one impeller under sufficient pressure to overcome the centrifugal pressure which is generated by the at least one impeller during rotation;

b. introducing said at least one catalyst into said mixing chamber at a catalyst introduction port under sufficient pressure to overcome the centrifugal pressure which is generated by the at least one impeller during rotation;

c. rapidly rotating said at least one impeller to intimately mix said at least one dimer, said at least one additive or compatible copolymerizable monomer, if present, and said at least one catalyst to form said dimer/catalyst mixture;

d. retaining said at least one dimer in said mixing zone long enough to intimately mix it with said at least one catalyst long enough to effect polymerization to a Brookfield melt viscosity of about 500 to about 3,000 centipoise e. withdrawing the resultant dimer/catalyst mixture from the mixing chamber at an exit port located near the axial center line of said mixing zone, said exit port being located at a point which is remote from said dimer introduction port and said catalyst introduction port; and f. subjecting said dimer/catalyst mixture that has been on a conveying means withdrawn from said mixing chamber to a temperature of about 130° to about 220° C. to increase the weight average molecular weight to about 20,000 to about 500,000.

2. The process of claim 1, wherein said at least one dimer comprises at least one cyclic ester of an alpha-hydroxycarboxylic acid.

3. The process of claim 1, wherein at least about 70 mole percent of said at least one dimer is selected from the group consisting of lactide, glycolide, and mixtures thereof, the remainder of said at least one dimer being at least one other copolymerizable monomer.

4. The process of claim 1, wherein said at least one catalyst comprises an end-capping agent.

5. The process of claim 1, wherein said at least one catalyst is selected from the group consisting of stannous compounds and rare earth compounds.

6. The process of claim If wherein the dimer/catalyst mixture exiting the mixing zone is fed to a moving conveyor where polymerization is completed.

7. The process of claim 3, wherein at least 80 mole percent of said at least one dimer is lactide.

8. The process of claim 1, wherein said at least one dimer comprises at least one of lactide and glycolide and said at least one compatible copolymerizable monomer comprises at least one monomer selected from the group consisting of epsilon-caprolactone, delta-valerolactone, 1,4-dioxan-2-one, beta-butyrolactone, beta-propiolactone and 6-methyl 2,5-morpholinedione.

9. The process of claim 4, wherein said end-capping agent comprises at least one alcohol.

* * * * *